(12) United States Patent
Clarke et al.

(10) Patent No.: US 6,191,918 B1
(45) Date of Patent: *Feb. 20, 2001

(54) EMBEDDED DUAL COIL PLANAR STRUCTURE

(75) Inventors: Thomas Carl Clarke, Morgan Hills; Robert Edward Fontana, Jr., San Jose; Richard Hsiao, San Jose; Eric James Lee, San Jose; Hugo Alberto Emilio Santini, San Jose, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/178,377

(22) Filed: Oct. 23, 1998

(51) Int. Cl.[7] ................................. G11B 5/147
(52) U.S. Cl. ........................................ 360/126
(58) Field of Search ..................... 360/121–126

(56) References Cited

U.S. PATENT DOCUMENTS

| | | | |
|---|---|---|---|
| 3,685,144 | 8/1972 | Trimble | 29/603 |
| 4,416,056 | 11/1983 | Takahashi | 29/603 |
| 4,684,438 | 8/1987 | Lazzari | 156/649 |
| 4,752,850 | 6/1988 | Yamada et al. | 360/121 |
| 4,816,946 | 3/1989 | Kira et al. | 360/110 |
| 5,113,300 | 5/1992 | Ikeda et al. | 360/126 |
| 5,448,822 | 9/1995 | Wu et al. | 29/603 |

FOREIGN PATENT DOCUMENTS

| | | |
|---|---|---|
| 62-256 209 | 11/1987 | (JP) . |
| 63-239 608 | 10/1988 | (JP) . |

*Primary Examiner*—Allen T. Cao
(74) *Attorney, Agent, or Firm*—Dan Hubert & Assoc.

(57) ABSTRACT

A read/write head is provided with an embedded planar dual coil write structure. The head includes generally parallel shield, shield/pole, and pole layers. The shield/pole layer abuts a generally coplanar planarization layer in one embodiment. A circuitous recess is defined in the shield/pole and planarization layer, spanning the junction twice and encircling a central hub of adjoining shield/pole and planarization layer material. A write structure is located in the recess, with the shield/pole layer, planarization layer, and embedded write structure forming a substantially flat surface for building the pole layer. The write structure includes first and second substantially co-planar multi-turn flat coils, where turns of the first write coil are interspersed with turns of the second write coil. The first and second write coils reside in the circuitous recess, winding around the central hub. An insulating material separates the first and second coils.

12 Claims, 10 Drawing Sheets

EMBEDDED DUAL COIL PLANAR STRUCTURE

BACKGROUND OF THE INVENTION

1. Field of the Invention

The present invention relates to read/write heads for reading and writing digital data to storage media such as magnetic disks. More particularly, the invention concerns a read/write head with a unique embedded planar dual coil structure, and a process for manufacturing such a head.

2. Description of the Related Art

In this modern information age, there is a tremendous volume of electronic data for people and computers to manage. The management requirements not only involve transmission, receipt, and processing of this information, but storage of the data as well. And, with more data to store, computer users are demanding extremely high capacity digital data storage devices. One of the most popular data storage devices is the magnetic disk drive system, also known as a "hard drive."

In magnetic disk drives, one of the most critical components is the read/write head. Read/write head characteristics ultimately determine how densely, quickly, and accurately data can be written to magnetic disk media. As a result, engineers are continually developing better and better read/write heads. Two of the chief areas of focus in read/write head development are data storage density ("areal density"), and read/write speed. In this respect, one improvement in the signal storage ability of read/write heads has been the use of two write coils. This has been shown to significantly improve the strength and efficiency of the data storage.

Figure 1:
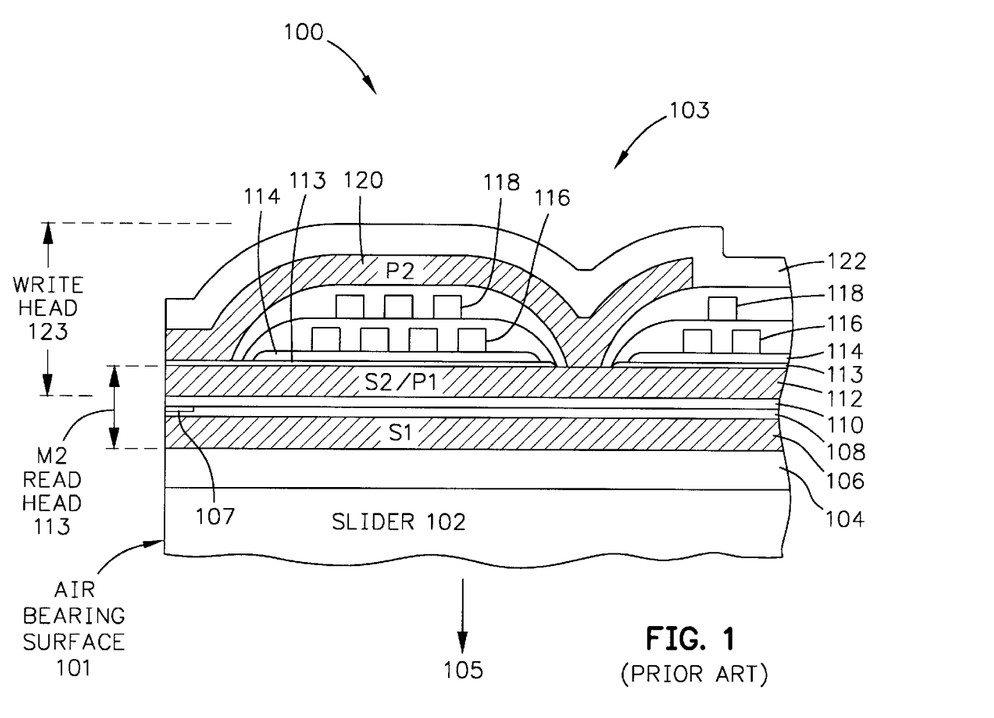
FIG. 1 is a partial cross-sectional diagram of a known dual coil read/write head.

FIG. 1 shows a partial cross-sectional view of an exemplary dual write coil read/write sensor 100, with the slider's deposit end ("trailing") being shown at 103, and the air bearing surface shown 101. The leading edge (not shown) resides in the direction 105. The sensor 100 is built upon a slider 102, beginning with an undercoat 104. Upon the undercoat 104 lies a first shield 106, known as "S1," followed by first and second gap layers 108, 110. Between the gap layers 108, 110 lies a magneto resistive ("MR") stripe 107. Upon the gap layer 110 lies a combination shield/pole 112 known as "S2/P1." The shield 106, MR stripe 107, and shield/pole 112 cooperatively form a magneto resistive read head 113 of the read/write sensor.

A write gap layer 113 is built upon the shield/pole 112, followed by an organic insulating layer 114. Upon the insulating layer 114 is based a first write coil 116, which includes a conductive coil embedded in an organic insulating material that is applied to fill the spacing between coil turns and separate the first coil layer from a second coil layer to follow. The second write coil 118 is layered on top of the first write coil 116, and similarly includes insulating material applied to fill the spacing between coil turns. A second pole 120, known as "P2," lies atop the second write coil 118. After fabricating the second write coil layer 118 and its insulation, a plating seed layer (not shown) is deposited, followed by a photo lithography process that defines the shape of the second pole 120. The "track width" constitutes the width of the second pole 120 (in a direction perpendicular to the page depicting FIG. 1) at the air bearing surface 101. Track width determines the track density on the disk where bits are written to and read from. The second pole 120 is protected by an overcoat layer 122. The shield/pole 112, write coils 116/118, write gap 113, insulation layer 114, and second pole 120 provide the write head 123 aspect of the read/write sensor 100.

One drawback of the sensor 100 is the severe topography created by the substantial height of the coil layers 116, 118 and insulation layer 114. This topography is severe because it presents a significant curvature beneath the pole 120, instead of a normally flat surface. In a two coil layer structure with organic insulation, the height of this structure can be as great as ten microns. This great height makes it extremely difficult to define the second pole 120, especially when a narrow track width is required, for the following reasons. The track width corresponds to the dimension of the second pole 120 in a direction perpendicular to the view of FIG. 1 (i.e., into the page). When track width is extremely narrow, there is a high "aspect ratio," defined as the ratio of the second pole's width (track width) to its length (from right to left in FIG. 1). Normally, when track width is larger than the second pole's length, no difficulty is presented for creating the pole 120 with known photo lithography processes. However, with the dual coil structure of FIG. 1, the second pole 120 exhibits a high aspect ratio, rendering photo lithography difficult or impossible. Moreover, this difficulty increases dramatically with more severe topographies, especially with today's track widths, which are frequently in the submicron range. In some cases, this difficulty may be so great that fabrication of the desired write head may be impossible.

Another drawback of the arrangement 100 is the amount of organic insulation present in the head. As mentioned above, organic insulation is present around the write coils 116, 118 as well as the insulating layer 114. The organic insulating material is typically a polymeric material. During operation, the write head is heated from current passing the coils. Organic insulation has a lower thermal conductivity than dielectric materials in the head, such as silicon-oxygen and aluminum-oxygen based materials. This low thermal conductivity impedes heat dissipation, causing the temperature of the write head to increase. Increased operating temperatures have various undesirable effects, such as decreasing head life. Furthermore, due to the organic insulation's relatively high thermal expansion coefficient, the organic insulation responds to the heat by expanding more than the nearby layers of the head. This expansion may cause portions of the head to protrude from the normally flat air bearing surface 101. With the head now enlarged by the protrusions, the head's effective flying height is smaller, and there is a greater danger of the head contacting the storage surface. Such contact may cause further heating of the head, or a disastrous head crash in extreme cases. To avoid head/disk contact, a higher flying height is necessary between the head and disk surface. However, with a higher flying height, signals stored by the write head are weaker, and require more surface area to safely store adjacent signals that are distinguishable from each other. Thus, the protrusion due to the presence of the organic insulation ultimately lowers the areal density of stored signals, diminishing the disk drive's storage capability.

In view of the foregoing, then, the structure and fabrication of known dual coil write heads present a number of unsolved problems.

SUMMARY OF THE INVENTION

Broadly, the present invention concerns an improved read/write head, including an embedded planar dual coil write structure. The head includes a shield layer, a shield/pole layer substantially parallel to the shield layer, and a pole layer substantially parallel to the shield and shield/pole layers. In one embodiment, one edge of the generally planar shield/pole layer reaches an air bearing surface of the head, and the opposite edge abuts a substantially coplanar planarization material. A circuitous channel spans the junction between the shield/pole and the planarization material twice, encircling a central "hub" (or "island") of shield/pole and bordering planarization material. A write structure is located in this channel, called a "recess", with the shield/pole and its portion of the embedded write structure covered by the pole layer.

The write structure includes first and second substantially coplanar multi-turn flat coils, where turns of the first write coil are interspersed with turns of the second write coil. Coil turns are substantially parallel to the shield/pole layer. The coils reside in the recess defined in the shield/pole layer and the planarization material and wind around the central hub. A dielectric material is present to separate the first coil from the second coil.

Accordingly, one aspect of the invention is an apparatus, such as a read/write head with an embedded planar coil write structure, or a disk drive system incorporating such a head. A different aspect is a method of fabricating the read/write head of the invention.

The invention affords its users with a number of distinct advantages. Unlike prior configurations, the invention provides a manageable topography for constructing a second pole layer in a dual coil read/write head. As a result, even with a dual coil construction, the invention may be used to construct read/write heads that define minuscule track widths of previously impossible dimension. Another advantage is that the invention's read/write head includes significantly less organic insulation material, since the two coils are integrated. This helps avoid undesirable heating and associated thermal expansion of the head. As a result, flying height can be lowered, increasing the areal density of stored signals, and proportionally decreasing the overall size of the storage media. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings. As mentioned above, the invention concerns a read/write head with a unique embedded planar dual coil structure, and a process for manufacturing such a head. As described below, a different aspect of the invention is a disk drive system incorporating a read/write head with an embedded dual coil write structure.

HARDWARE COMPONENTS & INTERCONNECTIONS

Slider

Figure 2:
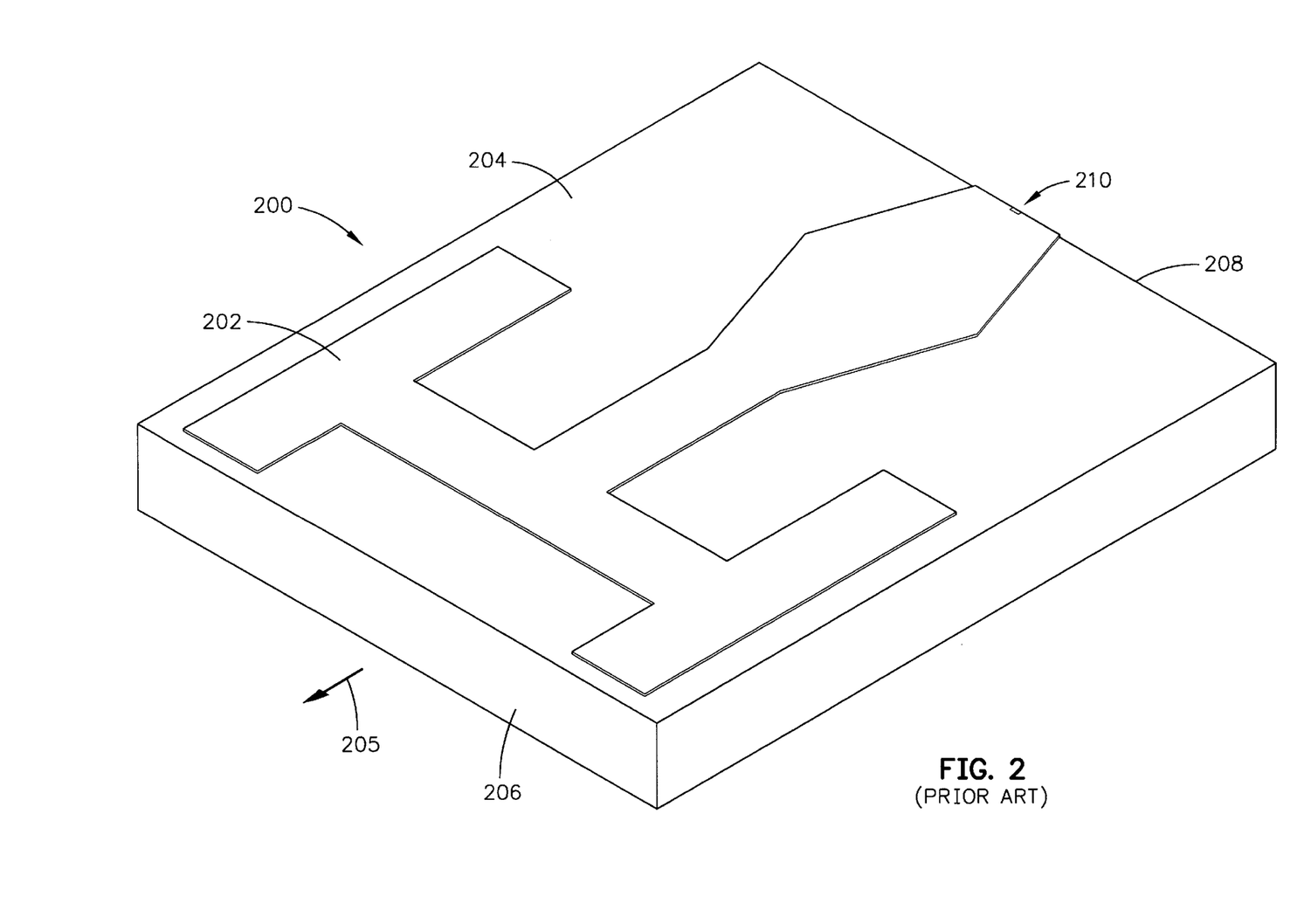
FIG. 2 is a perspective view diagram of a slider incorporating the read/write head of the invention.

FIG. 2 depicts a read/write head 200 in perspective view to help explain the invention in context. The head 200 includes an air bearing surface ("ABS") 202 which normally glides over a storage disk (not shown) separated by a thin cushion of air called an "air bearing" (not shown). In the illustrated example, the head 200 moves in a direction 205 relative to the storage medium. The ABS 202 is raised with respect to a surrounding surface 204 that is recessed by a process such as etching, ion milling, etc.

The head 200 has a leading edge 206 and a trailing edge 208. Near the trailing edge 208 lies a read/write head 210, which lies flush with the ABS 202 and contains circuit components that actually perform the read and write operations. These circuit components are deposited onto the trailing edge 208 of the head 200, which may also be called the "deposit end." As explained in greater detail below, the read/write head 210 includes a shield 220, a shield/pole 222, and a pole 224, each too small to be separately visible in FIG. 2. The shield 220 may also be called "S1," the shield/pole 222 may be referred to as "S2/P1," and the pole 224 may be referenced as "P2."

Read/Write Head Structure

Figure 3:
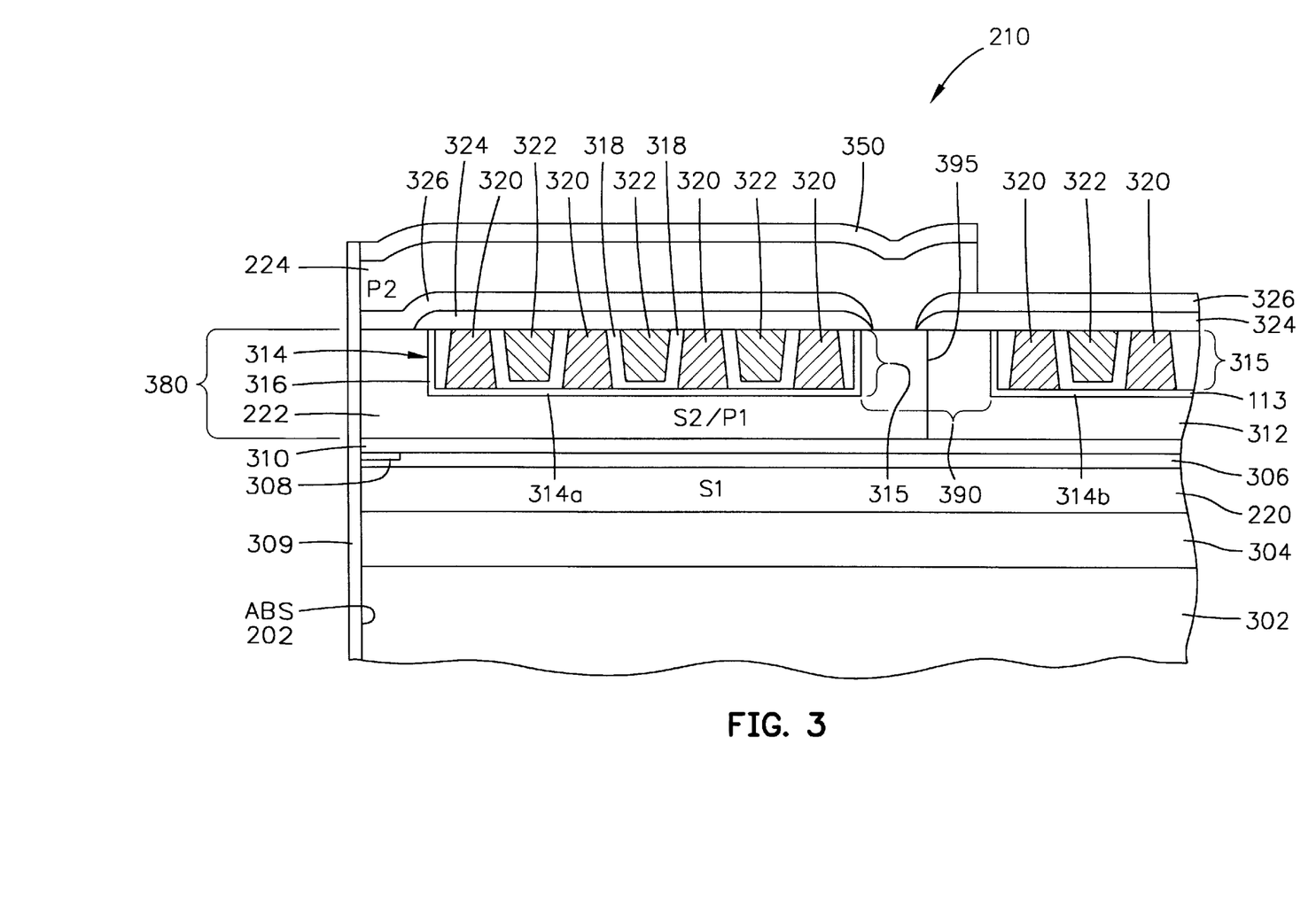
FIG. 3 is a partial cross-sectional side view of the read/write head of the invention.

FIG. 3 shows a partial cross-sectional view of the read/write head 210, which was generally described above with reference to FIG. 2. Referring to FIGS. 2–3, the read/write head 210 is built upon the trailing edge 208 of the head 200. More particularly, the read/write head 210 is built upon material of a slider 302, which may also be referred to as a substrate. The substrate may comprise silicon, a semiconductor, or another material with similar properties. As a specific example, the substrate may be a combination of elements such as aluminum, oxygen, titanium, and carbon. Above the slider 302 lies an undercoat layer 304, followed by the shield 220 (S1). The shield 220 comprises a magnetic material such as a nickel-iron alloy, nickel-iron-cobalt alloy, Sendust, a cobalt-zirconium-niobium alloy, etc. Atop the shield 220 lies a first gap layer 306, a second gap layer 310, and an MR stripe 308 interposed between the gap layers 306/310 proximate to the ABS 202. The gap layers 306/310 may comprise electrical insulators, for instance.

In the illustrated example, the gap 310 is covered by the shield/pole 222 (S2/P1), and also by a planarization layer 312 that abuts the shield/pole 222 at a junction 395. The shield/pole 222 and planarization layer 312 together form an intermediate layer 380 between the shield 220 and pole 224. In the illustrated example, the planarization layer 312 comprises an electrical insulator such as alumina, another aluminum-oxygen combination, a silicon-oxygen combination, or another material with suitable properties such as electrical insulation, a similar expansion coefficient as the shield 222, similar wear characteristics (e.g. lapping) as the shield 222, etc. The shield 222 comprises a magnetic material such as a nickel-iron alloy, nickel-iron-cobalt alloy, Sendust, cobalt-zirconium-niobium alloy, etc. In the alternative embodiment, the planarization layer 312 may comprise a conductive non-magnetic material. Although using an electrical insulator or conductive non-magnetic material as the planarization layer 312 offers the advantage of low inductance, the planarization layer 312 may comprise a magnetic material and may even be indistinguishable from the shield/pole 312; in this embodiment, the intermediate layer 380 and the shield/pole (S2/P1) are the same, and the shield/pole occupies both regions 222 and 312. For explanatory purposes, the present discussion illustrates the embodiment where the shield/pole 222 and planarization layer 312 are separate materials that meet at the junction 395.

The intermediate layer 380 exhibits a contiguous recess 314 defined in the shield/pole 222 and the layer 312 and spanning the junction between these parts. The recess 314 has the shape of a circuitous channel that spans the junction 395 twice, encircling a central "hub" 390 of shield/pole and adjacent planarization material. The recess 314 is "circuitous" in that it defines a continuous path, with no end or beginning as it travels around the central hub 390. The recess 314 is a contiguous channel traveling around the hub 390, but due to the cross-sectioned view of FIG. 3 appears as two separate recessed areas 314a–314b. As one example, the recess 314 may exhibit a ring ("annular") shape, with the hub 390 as its center. The recess 314 may, however, exhibit more elliptical, rectangular, or other features, depending upon the shape of the embedded planar dual coil write structure 315 to reside therein.

Figure 3A:
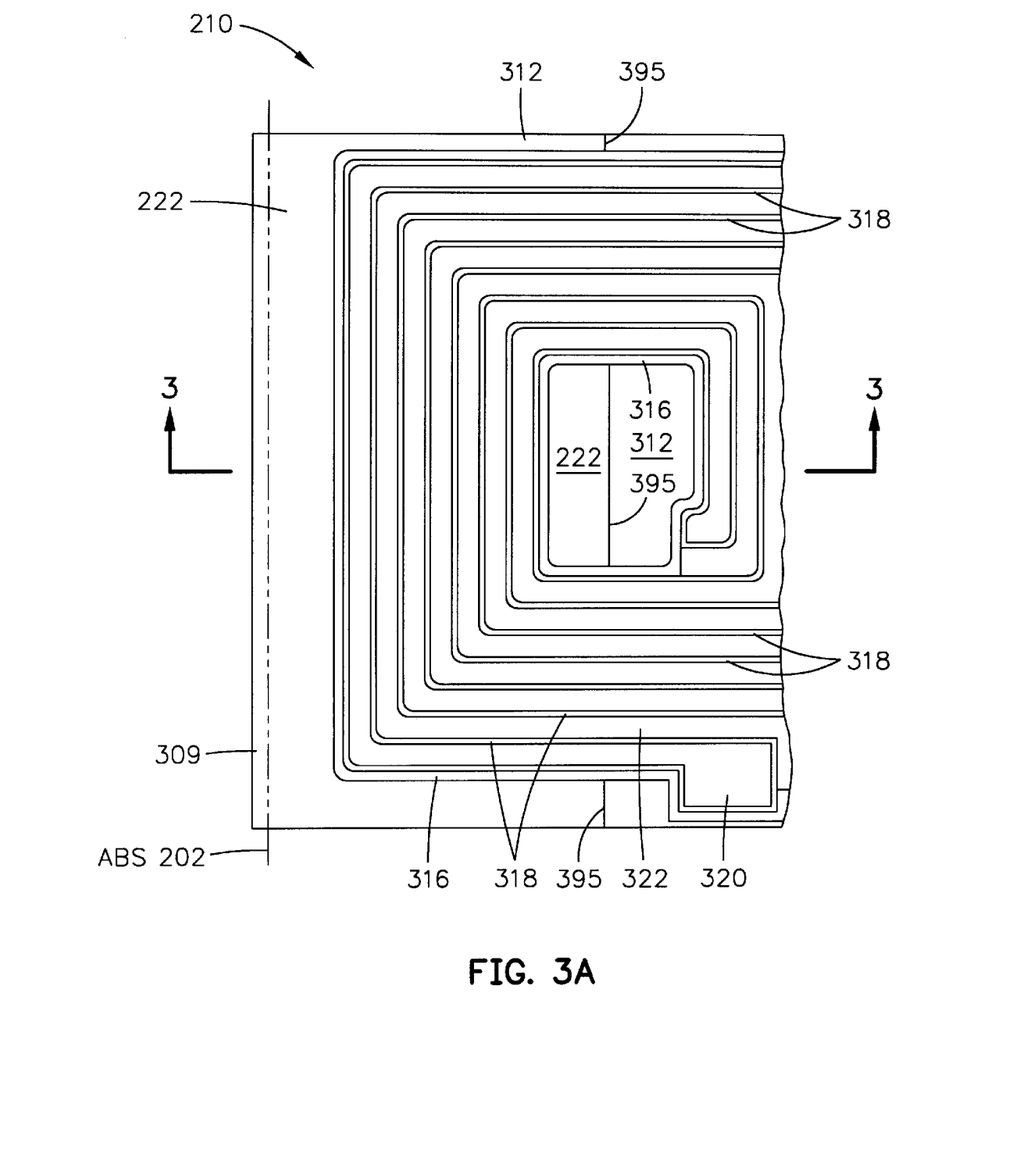
FIG. 3A is a cut-away top view of the read/write head of the invention with organic insulation, write gap, P2, and protective overlayer removed to feature the embedded planar dual coil structure of the invention.

More specifically, the planar dual coil write structure 315 includes an insulating layer 316, comprising alumina or another material with similar properties of electrical insulation. Atop the layer 316 reside a pair of write coils, made of a conductive material such as copper or another material with similar properties. The overall structure of each write coil is generally flat, where each coil starts from a central point and proceeds outward. As one example, the coils may be shaped spirally, like a burner coil of an electric stove. Alternatively, more elliptical, rectangular, or other shapes may be used. As both coils start and proceed outward together, the turns of one coil are interspersed with those of the other. One coil includes turns 320, whereas the other coil includes alternating turns 322 interspersed with the turns 320. The individual turns are tapered. In the case of the turns 320, for instance, they are tapered to provide a wider dimension toward the substrate 302. The turns 322 have an opposite taper, providing a smaller dimension toward the substrate 302. In the illustrated example, each tapered coil turn exhibits a generally trapezoidal cross section. The turns of one coil are electrically separated from the other coil's turns by a layer 318, which comprises an insulating material such as a dielectric substance. FIG. 3A shows the dual coil structure from a top view, with all layers (i.e., 324, 326, 224, 350) overlying the intermediate layer 380 and coils 320/322 removed, to more thoroughly illustrate the coil structure.

Over the shield/pole 222, dual coil write structure 315, and planarization layer 312 lies an insulating layer 324, which comprises an insulating material such as organic polymer, dielectric, an aluminum-oxygen combination, a silicon-oxygen combination, etc. Above the layer 324 is a write gap layer 326, comprising a non-magnetic, conductive or non-conductive material such as an aluminum-oxygen combination. The last magnetic component of the read/write head 210 is the pole 224, which overlies the write gap layer 326. The pole 224 comprises a magnetic material of similar composition as the shield 220 and shield/pole 222. The pole 224 is covered by a protective overlayer 350, made of alumina or another material seeming to encapsulate the head 200 and provide sufficient chemical and mechanical protection. A protective over layer 309 may also be applied at the air bearing surface, to guard various layers of the read/write head that would otherwise be exposed, such as layers 304, 220, 306, 308, 310, 222, 326, and 224. The layer 309 may comprise carbon or another layer providing sufficient chemical and mechanical protection to the read/write head 210.

Disk Drive System

Figure 4:
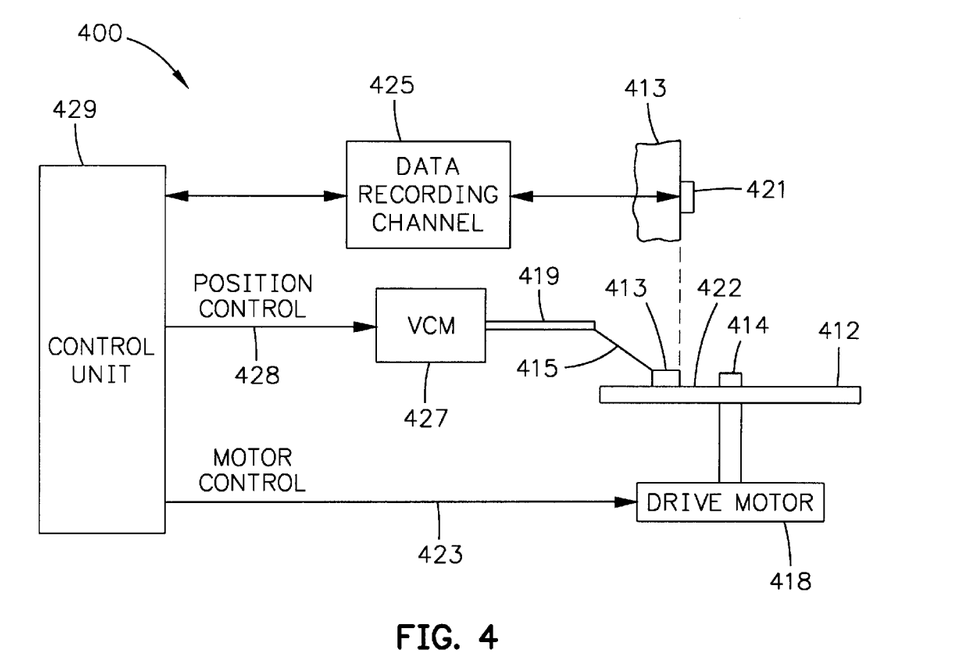
FIG. 4 is a block diagram of a disk drive system utilizing the read/write head of the invention.

FIG. 4 shows a different aspect of the invention, comprising a disk drive system 400 incorporating a read/write head with an embedded planar dual coil write structure. The disk drive system 400 includes at least one rotatable magnetic disk 412 supported on a spindle 414 and rotated by a disk drive motor 418. The magnetic recording media on each disk is in the form of an annual pattern of concentric data tracks (not shown) on the disk 412.

At least one slider 413 is positioned near the disk 412, each slider 413 supporting one or more magnetic read/write heads 421, where the head 421 incorporates the read/write head of the present invention. As the disks rotate, the slider 413 is moved radially in and out over the disk surface 422 so that the heads 421 may access different portions of the disk where desired data is recorded.

Each slider 413 is attached to an actuator arm 419 by means of a suspension 415. The suspension 415 provides a slight spring force that biases the slider 413 against the disk surface 422. Each actuator arm 419 is attached to an actuator mechanism 427. The actuator mechanism 419, for example, may be a voice coil motor ("VCM") comprising a coil movable within a fixed magnetic field, where the direction and speed of the coil movements are controlled by the motor current signals supplied by the controller 429.

During operation of the disk drive system 400, the rotation of the disk 412 generates an air bearing between the slider 413 and the disk surface 422, which exerts an upward force or "lift" on the slider. The surface of the slider 413 that includes the head 421 and faces the surface 422 is referred to as an air bearing surface ("ABS"). The air bearing counterbalances the slight spring force of the suspension 415 and supports the slider 413 off and slightly above the disk surface by a small, substantially constant spacing during normal operation.

In operation, the various components of the disk storage system are controlled by control signals generated by a control unit 429. These control signals include, for example, access control signals and internal clock signals. As an example, the control unit 429 may include various logic circuits, storage, and a microprocessor. The control unit 429 generates control signals to control various system operations such as drive motor control signals on line 423 and head position and seek control signals on a line 428. The control signals on the line 428 provide the desired current profiles to optimally move and position the slider 413 to the desired data track on the disk 412. Read and write signals are communicated to and from read/write heads 421 by means of a recording channel 425.

The above description of the magnetic disk storage system and accompanying illustration of FIG. 4 are for representation purposes only. Ordinarily skilled artisans (having the benefit of this disclosure) should recognize various additions or other changes that may be made to the system 400 without departing from the invention. Moreover, disk storage systems may contain a large number of disks and actuators, and each actuator may support a number of sliders.

Fabrication Process

In addition to the various hardware embodiments described above, a different aspect of the invention concerns a process for fabricating a read/write head with a unique embedded planar dual coil structure.

Introduction

Figure 5:
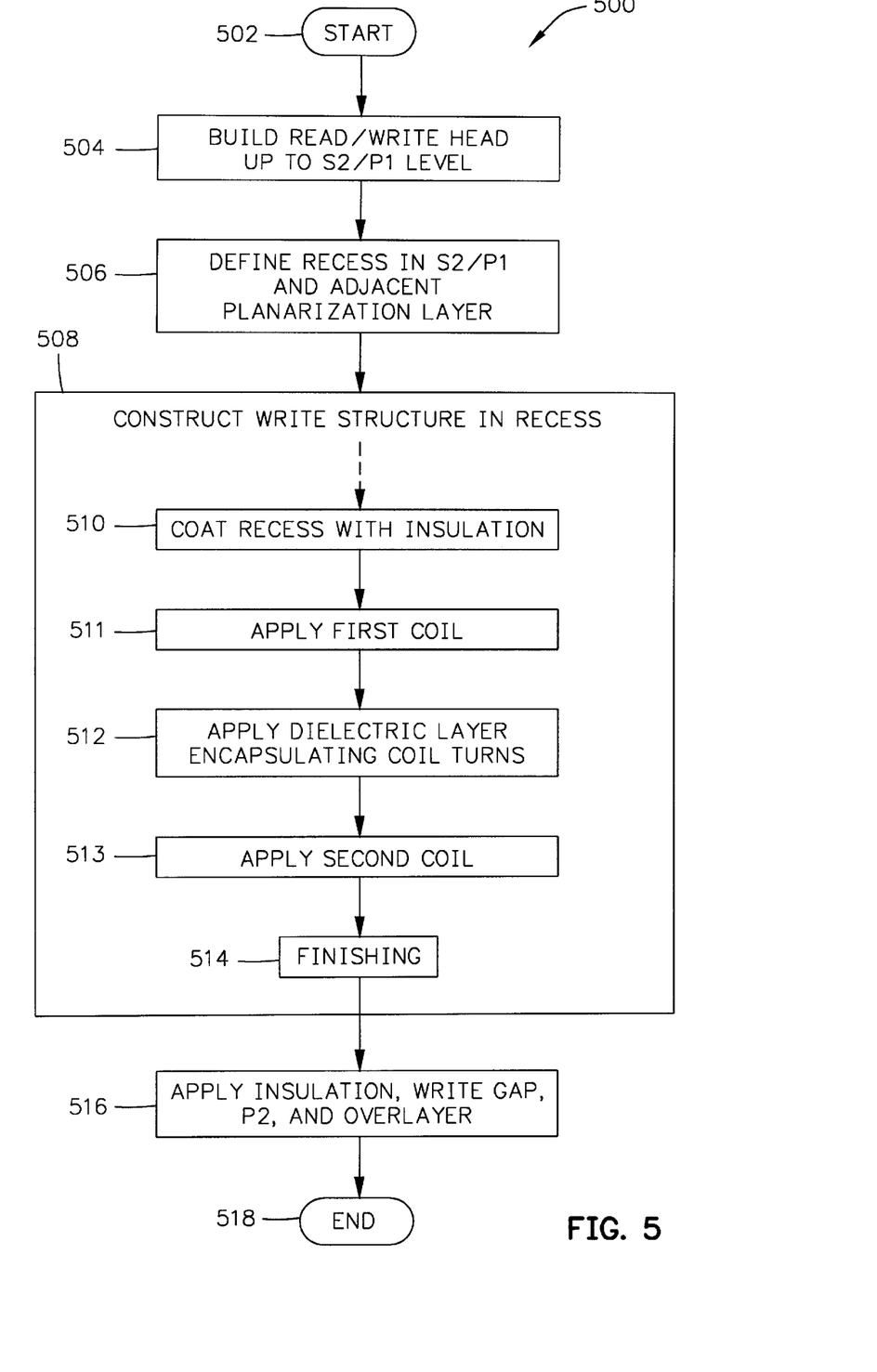
FIG. 5 is a flowchart of an operational sequence for fabricating an embedded planar dual write coil structure in accordance with the invention.

FIG. 5 shows a sequence 500 to illustrate one example of the process aspect of the present invention. The sequence 500 describes the construction of a read/write head incorporating the embedded planar dual write coil structure of the invention. For ease of explanation, but without any limitation intended thereby, the example of FIG. 5 is described in the context of the head shown in FIGS. 3–3A, and described above.

Building Initial Structure

After the process 500 is initiated in step 502, the read/write head is built until the shield/pole 222 is completed, as shown by step 504. This involves fabrication of the slider 302, overlayer 304, shield 220, gap layers 306/310, and MR stripe 308. As an example, these operations may be performed using techniques well known to ordinarily skilled artisans in this art. Upon the gap layer 310, the shield/pole 222 and planarization layer 312 are constructed. These components have substantially the same thickness, and abut each other at a common junction 395.

Defining Recess

Figure 6A:
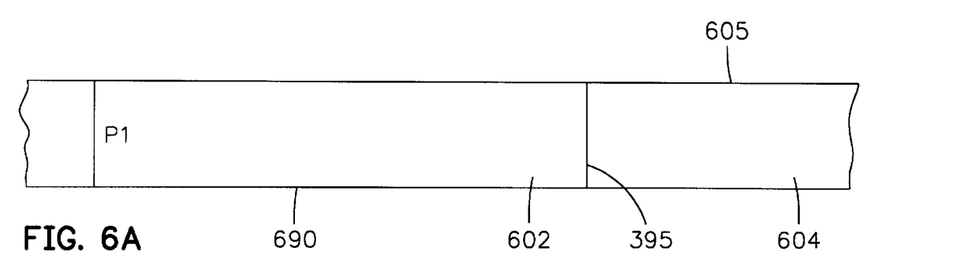
FIGS. 6A–6L are partial cross-sectional side views of a read/write head in various stages of fabrication according to the invention.

Having completed the read/write head up to the level of the intermediate layer 380, step 506 is then performed to define the 314 recess spanning the shield/pole 222 and the adjacent planarization layer 312 to accommodate the write coils. Creation of the recess 314 begins with the read/write head in the condition shown in FIG. 6A. At this point, the shield/pole 602 and adjacent layer 604 do not yet define any recesses. These layers meet at a junction 395, and provide a continuous, substantially flat surface 605. The layers 602 and 604 have a common lower surface 690 abutting the gap layer 310, which is not shown in FIGS. 6A–6L for ease of illustration.

Figure 6B:
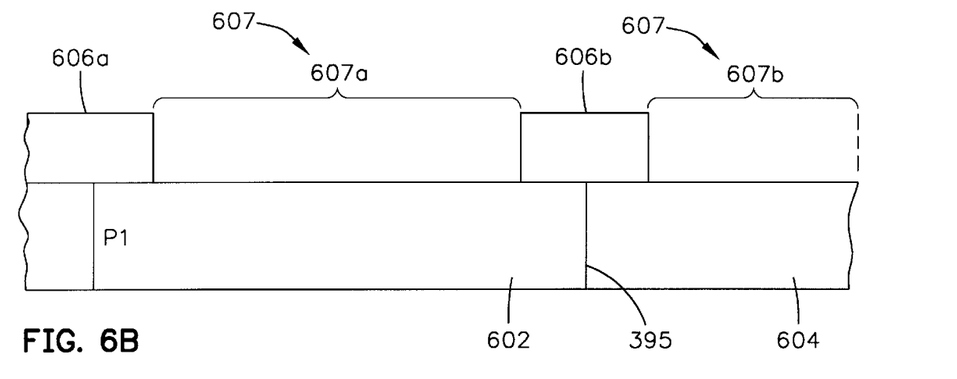
Figure 7:
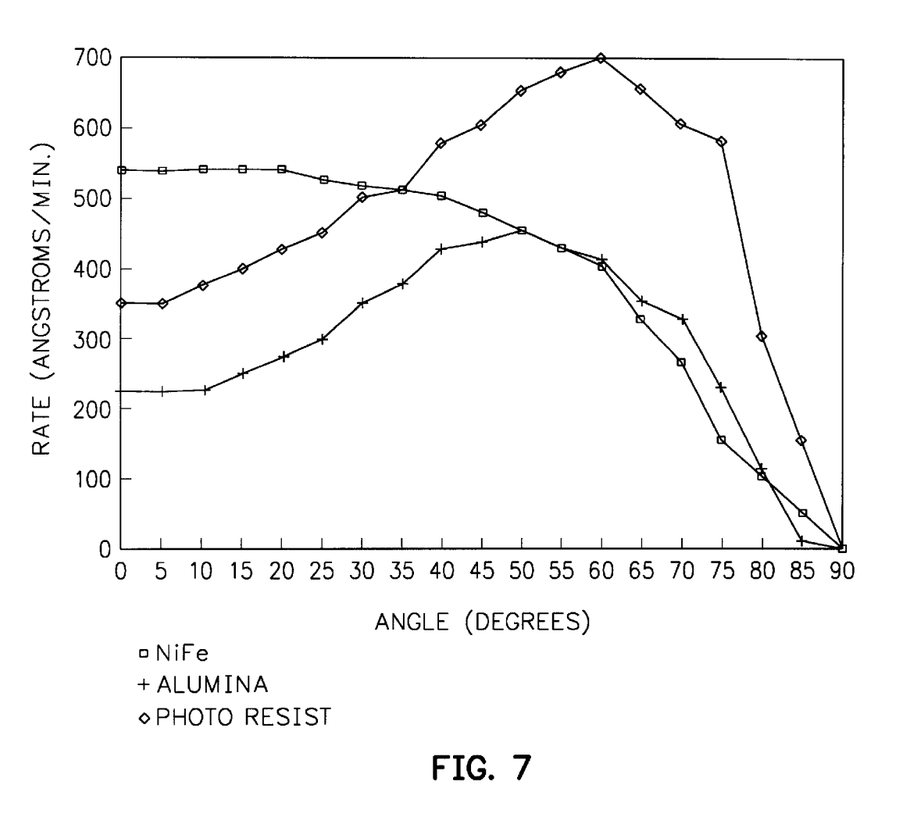
FIG. 7 is a diagram showing etch rates of NiFe, alumina, and photo resist as a function of milling angle.

The recess 314 (as shown by areas 314a–314b) is defined using a photo lithography process, which begins in FIG. 6B. Namely, photo resist masks 606a–606b are applied to define an opening 607 (areas 607a–607b) defining the desired location of the recess 314 (areas 314a–314b). The location of the mask 606b determines the position of the hub 390 (FIG. 3). Next, an ion milling process is applied to erode the shield/pole 602 and the layer 604 at substantially the same rate. In this present example, where the shield/pole 602 is made of a nickel-iron alloy and the layer 604 is made of alumina, a special technique is used to erode these materials at the same rate. Namely, this technique involves performing ion milling with the wafer tilted at about fifty to sixty degrees ("milling angle") using ion beam voltage of about 650 volts. The inventors have discovered that this technique mills the shield/pole 604 and layer 604 at about the same rate. FIG. 7 shows the milling rate of nickel-iron (NiFe), alumina, and photo resist as a function of milling angle at 650 V beam voltage. The milling rates of nickel-iron and alumina are essentially equal at milling angles of about fifty to sixty degrees.

Figure 6C:
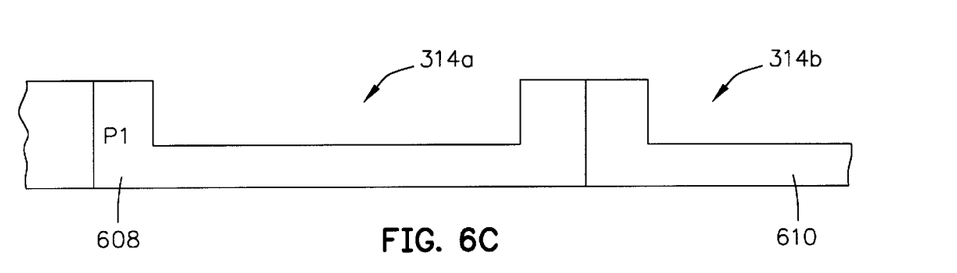

After the shield/pole 602 and overlayer 604 are milled sufficiently to the desired depth, and the photo resist masks 606a–606b removed, the read/write head appears as shown in FIG. 6C. Namely, recessed areas 314a–314b are now provided in the opening 607 left by the masks 606a–606b. Removal of the photo resist masks 606a–606b may be achieved by applying a solvent, or another known technique. The milled shield/pole 308 and milled planarization layer 610 are shown in FIG. 6C.

Constructing Write Structure—Coating Recess With Insulation

Figure 6D:
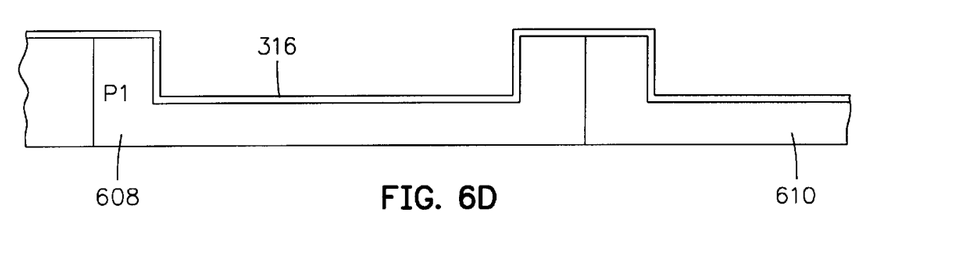

With construction of the read/write head advanced to the state shown in FIG. 6C, construction of the write structure occurs in step 508. As shown below, the write structure includes a pair of substantially planar coils, and these coils are embedded in the recessed areas 314a–314b created in the shield/pole 608 and planarization layer 610. In step 510, the recessed areas 314a–314b are coated with a layer 316 of alumina or another insulating material of similar properties. As an example, the layer 316 may have a thickness of about 2000 Angstroms. This is performed to electrically insulate the shield/pole 608 from the write coils, and may be accomplished using a suitable technique such as vacuum deposition. More particularly, step 510 may employ sputtering deposition. The completed insulation layer 316 is shown in FIG. 6D.

Constructing Write Structure—First Coil

Figure 6E:
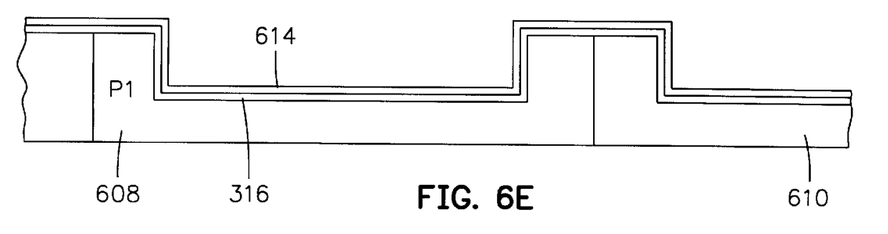

After step 510, the first coil is applied in step 511, this step involving a number of sub-steps. First, as shown in FIG. 6E, a conductive seed layer 614 is applied by an appropriate technique, such as sputtering deposition. As an example, the seed layer 614 may comprise a chromium/copper layer (CrCu) of about 800 Angstroms. The seed layer 614 provides a surface conducive to the addition of conductive coil material, as discussed below.

Figure 6F:
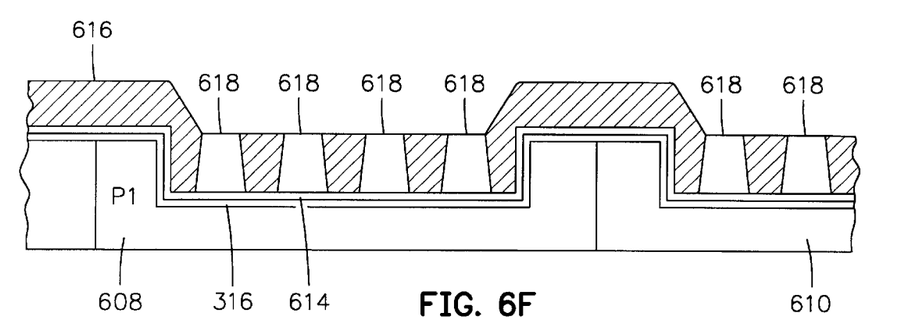

Next, a "cast" is made in the proper shape to create coils of the first write coil. A completed cast 616 is shown in FIG. 6F, and may be constructed by a suitable photo lithography process. For example, a resist material, such as a photosensitive polymer, may be applied using a spin coat technique. Then, a mask is applied for exposure and the unwanted resist material is dissolved using a developing chemical. This forms a cast 616, which is made of the resist material. The cast 616 includes a number of openings 618, which define the shape of the first write coil, as discussed below.

In the illustrated embodiment, the openings 618 are "tapered," being wider at the bottom and narrower at the top to define a shape of trapezoidal cross-section. This is useful, as discussed below, because the resultant first write coil will provide a cast for creating a second write coil of complementary shape. This tapered shape is achieved by using a negative tone resist.

Figure 6G:
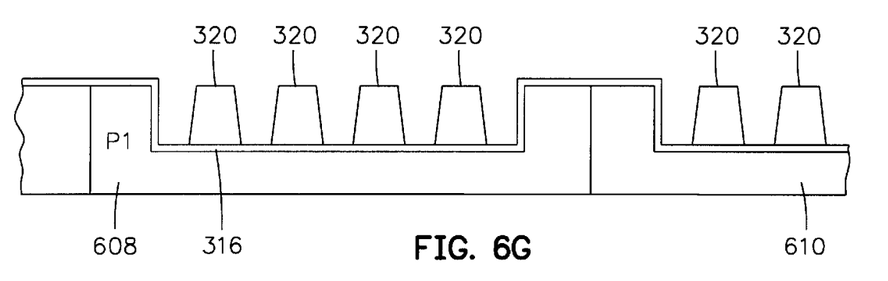

With the cast 616 defined, the coil material is applied to the openings 618. As an example, this material may be copper, which is applied by electroplating. After applying the coil material, the resist cast 616 is stripped using an organic solvent such as acetone or N-methylpyrrolidone or another dissolving chemical; also the seed layer 614 is removed using a dry etch technique such as ion milling. This completes the first coil, and step 511. As shown in FIG. 6G, the coil includes multiple turns 320, the shape of which has been defined by the now-absent resist openings 618.

Constructing Write Structure—Encapsulating

After the first write coil is constructed in step 511, the dielectric layer 318 is applied over the first write coil in step 512. This encapsulates the turns, insulating them from the second write coil, to be applied next. Step 512 may be performed by applying a dielectric material by a suitable vacuum deposition technique, such as chemical vapor deposition, sputtering, plasma deposition, or enhanced chemical vapor deposition. As a more specific example, the dielectric layer 318 may comprise 5000 Angstroms of chemical vapor deposition ("CVD") or plasma enhanced chemical vapor deposition ("PECVD"). The tapered shape of the write coil 320 improves the coverage of the dielectric layer 318 over the coil turns.

Figure 6H:
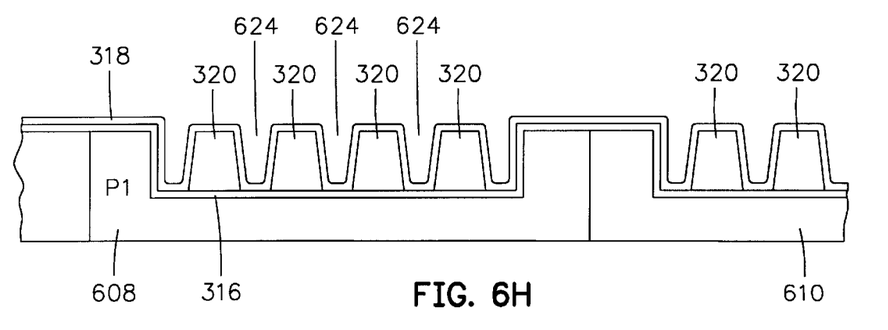

FIG. 6H depicts the read/write head with encapsulated write coils. The surface of the dielectric layer 318 defines a number of recesses 624, shaped to provide a cast for construction of the second write coil.

Constructing Write Structure—Second Coil

Figure 6I:
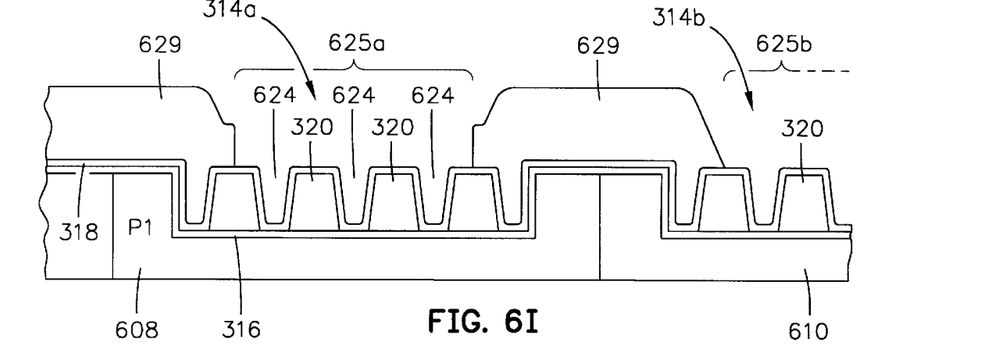

After the insulation is applied in step 512, construction of the second write coil begins. Referring to FIG. 6I, a seed layer (not shown) is first applied to the dielectric layer 318 by an appropriate technique, such as sputtering deposition. As an example, the seed layer may comprise a chromium/copper layer (CrCu). The seed layer provides a surface conducive to the addition of conductive coil material, as discussed below.

Next, a suitable photo lithography process is performed to construct a resist mask 629 covering the read/write head, except for the recessed areas 314a–314b. The resist mask 629 may additionally cover a small portion of the outer ends of the recessed areas 314a–314b (as shown), in order to avoid the deposition of coil material in those areas. The resist mask 629 is constructed by applying a resist material (not shown), such as a photosensitive polymer, using a spin coat technique. Then, another mask (not shown) is applied and the exposed resist material is dissolved using a developing chemical. This forms the resist mask 629, which provides openings 625a–625b.

Figure 6J:
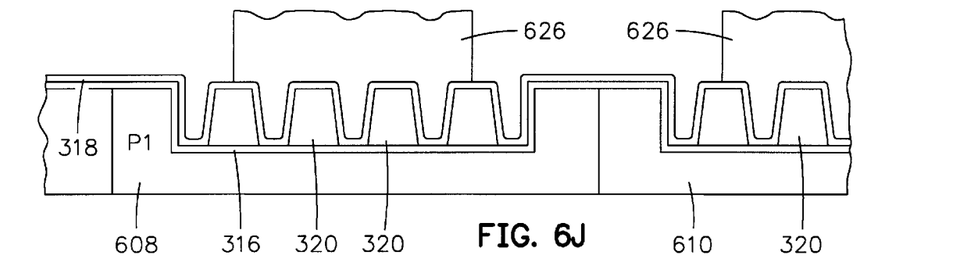

With the resist mask 629 in place as shown in FIG. 6I, a coil material is applied. Application of the coil material is limited to area left by the openings 625a–625b. As an example, the coil material may be copper, which is applied by electroplating. After applying the coil material, the resist mask 629 is stripped using an organic solvent such as acetone or N-methylpyrrolidone or another dissolving chemical; also, the seed layer is removed using a dry etch technique such as ion milling. This completes step 513, leaving the read/write head in the condition shown by FIG. 6J. Although the material of the second coil is in place, some finishing work still remains, as explained below.

Constructing Write Structure—Finishing

After step 513, a finishing step 514 is performed. First, the read/write head is processed with chemical-mechanical polishing to wear away the excess copper material 626 protruding beyond the recesses 614a–614b. More particularly, polishing may be performed using a slurry of quartz particles suspended in persulfate ammonium potassium aqueous solution, with the persulfate concentration at about 3%. After polishing, the seed layer is removed by a suitable technique, with one example being a dry etch technique such as ion milling. With the seed layer gone, material of the dielectric layer 318 protruding beyond the recessed areas 314a–314b is removed by a process such as a wet etch technique.

Figure 6K:
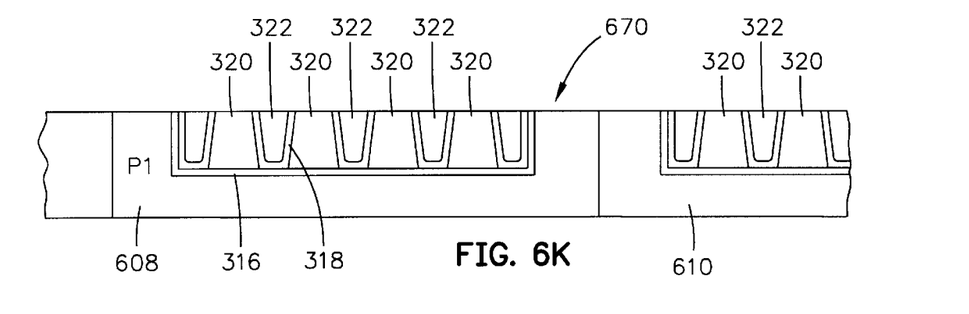

The result of the finishing step 514 is the read/write head as shown in FIG. 6K. At this point in the fabrication process, the first coil 320 and second coil 322 are in place. Turns of the first coil 320 alternate with turns of the second coil 322. The turns of each coil are insulated from the other coil by the insulating layer 318. All coil turns exhibit a tapered shape, where turns 320 of the first coil are wider toward the underlying shield/pole 608, and turns 322 of the second coil are narrower toward the shield/pole 608. Both write coils are completely embedded in the shield/pole 608 and the planarization layer 610, with these structures cooperatively providing a flat surface 670 for building the pole 224, as discussed below.

Completing the Read/Write Head

Figure 6L:
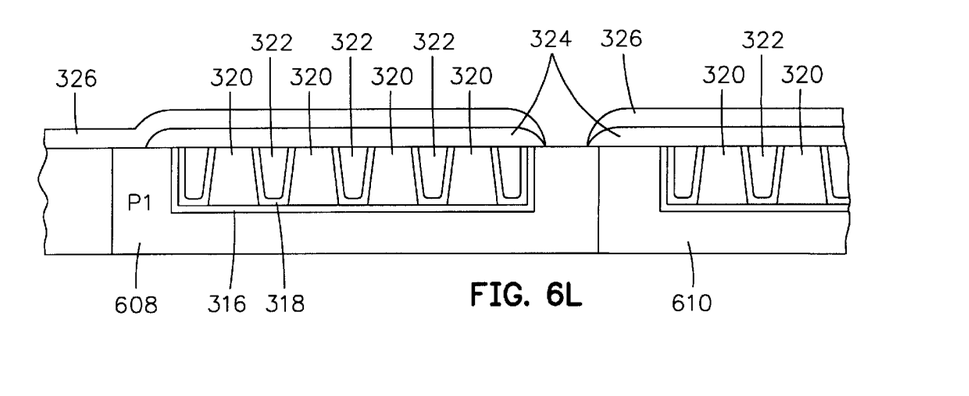

After step 514, the write structure is complete, ending step 508. Next, step 516 is performed to complete the read/write head. First, the insulating layer 324 is applied over the recess 314 containing the write coils as shown in FIG. 6L. Application of the insulation layer 324 may be achieved using photo lithography, the details of which have been explained above. The insulating layer 324 comprises an organic material, such as a polymer. After placing the insulation layer 324, it may be cured by baking.

Upon the insulating layer 324 is placed a write gap 326, as shown in FIG. 6L. The write gap may be layered using vacuum deposition, for example. Placement of the write gap 326, and the ensuing pole 224 and protective overcoat 350 (not shown in FIG. 6L) may be achieved by well known techniques. Known methods may also be used to connect the write coils 320, 322 to appropriate conductive leads.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A magnetic write head, comprising:
   a shield layer;
   a pole layer substantially parallel to the shield layer;
   an intermediate layer interposed between and substantially parallel to the shield and pole layers, the intermediate layer including a magnetic shield/pole material and having a first surface facing the pole layer, the surface having defined therein a circuitous recess surrounding a hub of unrecessed intermediate layer material; and
   a write structure including first and second substantially co-planar multi-turn flat write coils, where turns of the first write coil are interspersed with turns of the second write coil, and all portions of both first and second write coils reside in the circuitous recess and wind around the hub.

2. The head of claim 1, where:
   the intermediate layer includes a shield/pole layer abutting a substantially coplanar planarization layer to form a junction, where the circuitous recess defined in the intermediate layer surface recess spans the junction and where the hub of includes a portion of the junction.

3. The head of claim 1, the recess being substantially ring-shaped.

4. The head of claim 1, further comprising an insulating material separating the first and second coils.

5. The head of claim 4, the insulating material comprising a dielectric material.

6. The head of claim 1, further comprising an insulating layer coating at least part of the first surface of the intermediate layer.

7. The head of claim 1, the coil turns having trapezoidal cross-sections.

8. The head of claim 1, the pole layer being substantially flat.

9. The head of claim 2, the shield/pole layer comprising nickel iron and the planarization layer comprising alumina.

10. The head of claim 1, the turns of the first and second coils having complementarily tapered cross-sectional profiles.

11. A disk drive system, comprising:
    one or more magnetic storage disks mounted on a spindle, each disk having at least one storage surface;

a motor coupled to the spindle to rotate the disks about the spindle; and a suspension assembly, comprising, for each storage surface:

an adjustable actuator assembly having a distal end;

a write head affixed to the distal end, the head being maintained in a substantially fixed position relative to the disks media during relative motion between the head and the media, the head comprising:

a shield layer;

a pole layer substantially parallel to the shield layer, an intermediate layer interposed between and substantially parallel to the shield and pole layers, the intermediate layer including a magnetic shield/pole material and having a first surface facing the pole layer, the surface having defined therein a circuitous recess surrounding a hub of unrecessed intermediate layer material; and a write structure including first and second substantially co-planar multi-turn flat write coils, where turns of the first write coil are interspersed with turns of the second write coil, and all portions of both first and second write coils reside in the circuitous recess and wind around the hub.

12. The disk drive system of claim 11, where:

the intermediate layer includes a shield/pole layer abutting a substantially coplanar planarization layer to form a junction, where the circuitous recess defined in the intermediate layer surface recess spans the junction and where the hub includes a portion of the junction.

\* \* \* \* \*

UNITED STATES PATENT AND TRADEMARK OFFICE
CERTIFICATE OF CORRECTION

PATENT NO.    : 6,191,918 B1
DATED         : February 20, 2001
INVENTOR(S)   : Thomas Carl Clarke et al.

It is certified that error appears in the above-identified patent and that said Letters Patent is hereby corrected as shown below:

Column 10,
Line 46, delete "of" between "where the hub" and "includes a portion of".

Column 11,
Line 11, delete the comma "," after the word "layer" and replace with a semicolon -- ; --.

Signed and Sealed this

Eighth Day of April, 2003

JAMES E. ROGAN
*Director of the United States Patent and Trademark Office*